United States Patent
Mehta et al.

(10) Patent No.: US 8,627,330 B2
(45) Date of Patent: *Jan. 7, 2014

(54) WORKLOAD MANAGER MANAGING A WORKLOAD OF AN ENTERPRISE DATA WAREHOUSE

(75) Inventors: Abhay Mehta, Austin, TX (US); Chetan Kumar Gupta, Austin, TX (US); Umeahwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1114 days.

This patent is subject to a terminal disclaimer.

(21) Appl. No.: 12/256,361

(22) Filed: Oct. 22, 2008

(65) Prior Publication Data

US 2009/0178042 A1 Jul. 9, 2009

Related U.S. Application Data

(60) Provisional application No. 61/042,954, filed on Apr. 7, 2008, provisional application No. 61/010,132, filed on Jan. 3, 2008.

(51) Int. Cl.
*G06F 13/10* (2006.01)
(52) U.S. Cl.
USPC .......................................... 718/106; 718/105
(58) Field of Classification Search
None
See application file for complete search history.

(56) References Cited

U.S. PATENT DOCUMENTS

| | | | | |
|---|---|---|---|---|
| 3,411,139 A | * | 11/1968 | Lynch et al. | 710/1 |
| 5,881,284 A | * | 3/1999 | Kubo | 718/100 |
| 6,338,072 B1 | * | 1/2002 | Durand et al. | 718/104 |
| 6,353,844 B1 | * | 3/2002 | Bitar et al. | 718/102 |
| 6,763,519 B1 | * | 7/2004 | McColl et al. | 718/100 |
| 7,657,501 B1 | * | 2/2010 | Brown et al. | 707/999.002 |
| 7,664,561 B1 | * | 2/2010 | Chen et al. | 700/101 |
| 2002/0138679 A1 | * | 9/2002 | Koning et al. | 710/244 |
| 2005/0160074 A1 | * | 7/2005 | Vos et al. | 707/1 |
| 2005/0235289 A1 | * | 10/2005 | Barillari et al. | 718/100 |
| 2006/0206900 A1 | * | 9/2006 | Ooyama et al. | 718/105 |
| 2007/0100793 A1 | * | 5/2007 | Brown et al. | 707/2 |
| 2007/0106991 A1 | * | 5/2007 | Yoo | 718/103 |
| 2007/0169125 A1 | * | 7/2007 | Qin | 718/102 |
| 2007/0271570 A1 | * | 11/2007 | Brown et al. | 718/105 |
| 2008/0077932 A1 | * | 3/2008 | Ruppach et al. | 718/105 |

OTHER PUBLICATIONS

Brown et al. "Managing Memory to Meet Multiclass Workload Response Time Goals", Technical Report # 1146, Apr. 1993.*

* cited by examiner

*Primary Examiner* — Eric Coleman (57) ABSTRACT

Described herein is a workload manager for managing a workload in a database that includes: an admission controller operating to divide the workload into a plurality of batches, with each batch having at least one workload process to be performed in the database, and each batch having a memory requirement based on the available memory for processing workloads in the database; a scheduler operating to assign a unique priority to each of the at least one workload process in each of the plurality of batches, the unique priority provides an order in which each workload process is executed in the database; and an execution manager operating to execute the at least one workload process in each of the plurality of batches in accordance with the unique priority assigned to each workload process.

20 Claims, 7 Drawing Sheets

WORKLOAD MANAGER MANAGING A WORKLOAD OF AN ENTERPRISE DATA WAREHOUSE

CROSS-REFERENCE

This application claims the benefit of U.S. Provisional Application Ser. No. 61/042,954, entitled, "SCHEDULING MEMORY USAGE OF A WORKLOAD," as filed on Apr. 7, 2008; and U.S. Provisional Application Ser. No. 61/010,132, entitled, "PROCESSING BATCH DATABASE WORKLOAD WHILE AVOIDING OVERLOAD", as filed on Jan. 3, 2008. These applications are herein incorporated by reference in their entireties.

BACKGROUND

Many enterprises, such as companies, corporations, and organizations, are creating and deploying "enterprise data warehouses" to serve as the single source of corporate data for business intelligence. As referred herein, a data warehouse is a data storage or repository that includes one or more electrical or electronic data storage devices such as computers, servers, computer databases, and the like. Also, as referred herein and understood in the art, business intelligence (BI) includes applications and technologies that work together to collect, provide access to, and analyze data and information about operations of a business or a desired entity. Enterprise data warehouses are expected to both scale to enormous data volumes (hundreds of terabytes) and perform well under increasingly complex workloads, which typically include batch and incremental data loads, batch reports, and/or complex ad hoc queries. A key challenge is to manage each complex workload in order to meet stringent performance objectives. For example, batch load tasks may be required to finish within a specified time window before reports or queries can be serviced, batch reports may issue thousands of "roll-up" (aggregation) queries that are required to complete within a specified time window, and ad hoc queries may have user-specified deadlines and priorities.

Accordingly, there is a desire to have effective workload management of an enterprise data warehouse (EDW) in order to allocate resources therein and execute workloads assigned thereto so as to meet desired performance objectives.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A common workload that is handled by an enterprise data warehouse (EDW) system is a batch of queries. The workload-management objective for such a workload is to minimize the response time of the workload. This is important because an EDW system often spends a considerable amount of its operational time running batch workloads such as roll-up queries and reports. The current trend is towards even larger queries and batches as data mining and analytics are increasingly becoming central activities for a large data warehouse. The response time of a batch workload running on an EDW system depends on many factors, such as the number and type of queries, system configuration, number of concurrent streams of queries running on the system, etc. One metric of measuring the response time of a workload is throughput. The throughput is measured in queries completed in a unit time. That is, in the context of a batch of queries, throughput is more concerned with the overall response time for a batch of queries rather than the individual response time of each query in the batch.

Figure 1:
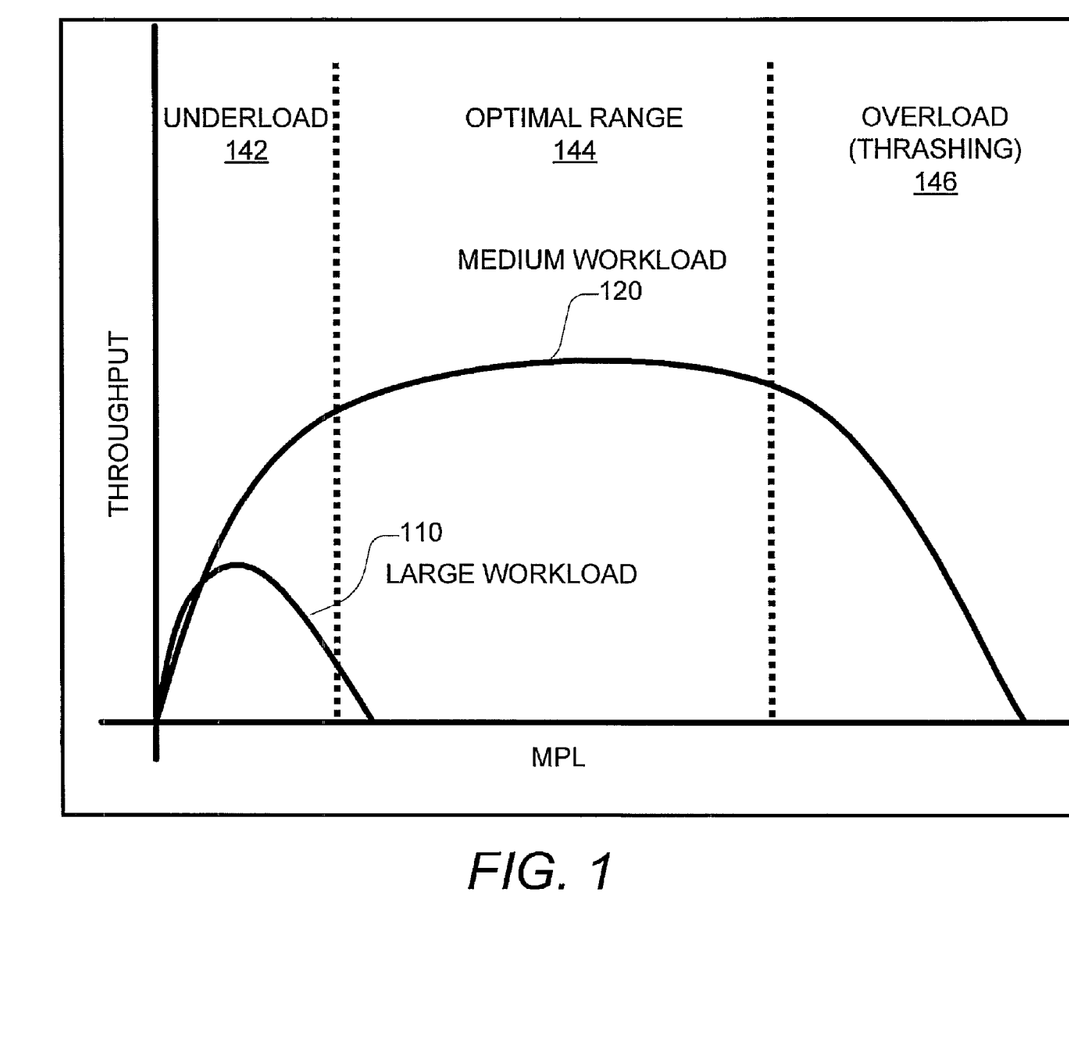
FIG. 1 illustrates a graph of throughput curves for different workloads to show optimum throughput desired to be achieved, in accordance with one embodiment.

One way of looking at throughput is with a throughput curve, wherein throughput is plotted against the "load" on an EDW system. Traditionally, multiprogramming level (MPL) has been used to measure a "load" and as the manipulated variable of choice for workload management. As referred herein and understood in the art, MPL is the number of processes or jobs that may be active (that is, executed) at a time in a data processing system such as the EDW system. FIG. 1 illustrates a graph of throughput curves for two different workloads, a "large" workload (curve 110) that includes several large, resource intensive queries and a "medium" workload (curve 120) that includes several medium queries. In the graph, the x-axis is the multiprogramming level (MPL) and the y-axis is throughput. The throughput curves 110 and 120 may be divided into three regions. FIG. 1 illustrates these three regions for the throughput curve 120 of the medium workload: (i) the underload region 142 (where, by increasing MPL a higher throughput can be achieved), (ii) the pptimal load region 144 (also known as saturation where by increasing MPL there is not much change in throughput), and (iii) the overload region 146 (where increasing MPL results in lower throughputs). The overload or thrashing region 146 is considered an issue for maintaining optimal throughput.

An issue with MPL is that as the workload changes, the MPL also needs to be changed. That is, when a system operator or user first confronts a new workload, the precise shape of the throughput curve is unknown to the user, who then has to determine the MPL at which to execute the workload. Typically, the user does not want to be on the left part of the curve, that is, in the underload region 142, because it remains possible to increase the throughput by increasing the MPL. However, as the MPL is increased, there is a danger of entering the overload or thrashing region 146, wherein higher MPLs mean a lower throughput. Very often, increasing the MPL by even one from an MPL on the boundary of the optimal region 144 may cause an immediate severe performance deterioration rather than a gradual decline in performance. This issue is further exacerbated in the EDW space by the fact that a typical BI workload may fluctuate rapidly between long, resource intensive queries, and short, less intensive queries. Thus, at each instant of time, the EDW system may experience a different mix of queries that requires a different optimal setting of MPL.

As described in various embodiments herein, the goal of workload management is to operate the EDW system in the optimal load region 144 in accordance with performance objectives by properly admitting, scheduling, and executing queries and allocating resources for such queries. Accordingly, described herein are systems and methods for a BI workload manager that may be employed in an EDW system for running batches of queries or other types of memory-accessing workloads while protecting against both underload and overload. Thus, the BI workload manager aims to maximize the throughput of BI batch workloads while protecting against underload and overload. The BI workload manager may be employed by operators or users of the EDW system that are interested in enhancing or improving the performance of the EDW system. For example, the system operators or users potentially includes in-house personnel of a company that maintains the EDW system, outside consultants setting up a new EDW system or optimizing an existing EDW system in a company. Although various embodiments as described herein refer to an EDW system, it should be understood that such embodiments are also applicable for any electrical, electronic, or other types of data storage device or system without deviating from the scope of the embodiments.

Figure 2:
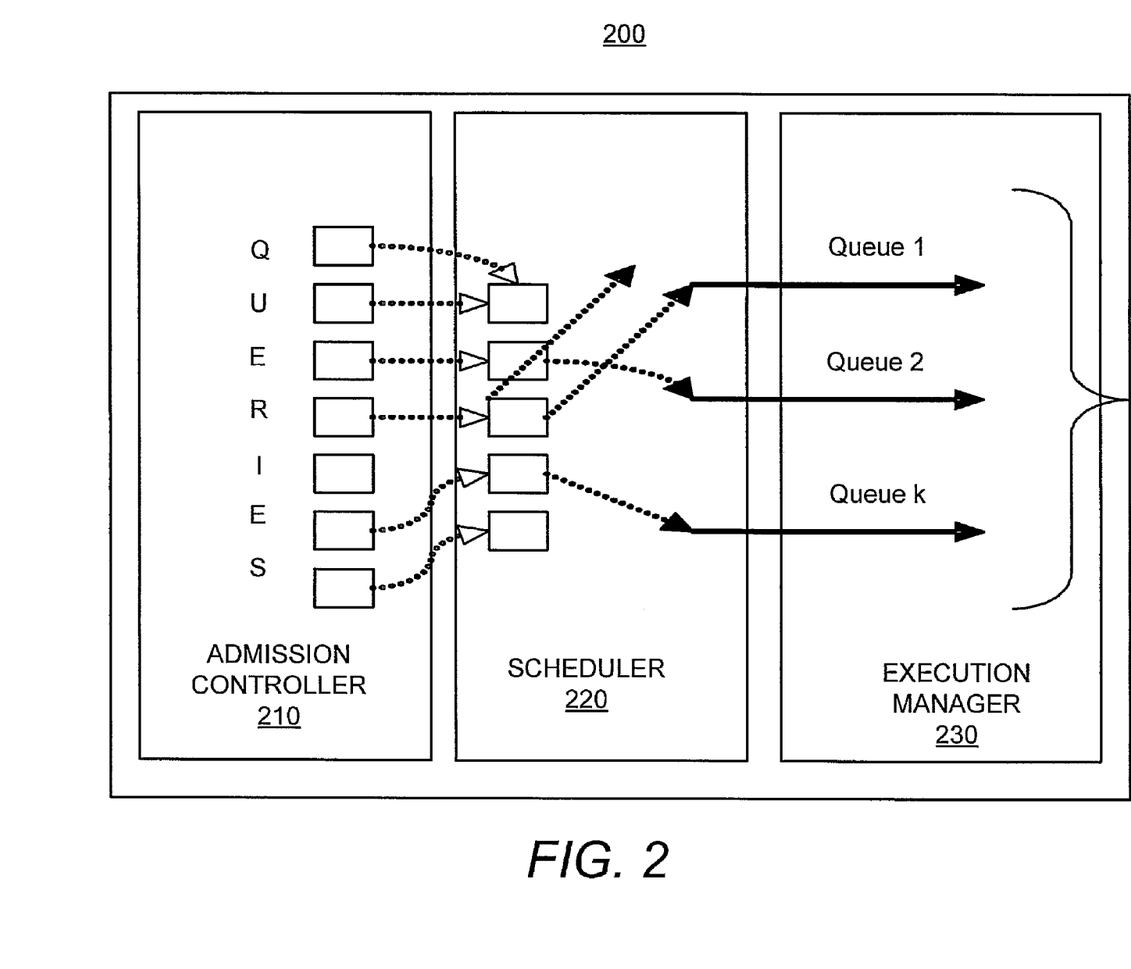
FIG. 2 illustrates a workload manager for managing workloads in an enterprise data warehouse (EDW), in accordance with one embodiment.

FIG. 2 illustrates a workload manager 200, such as a workload manager for business intelligence (BI), in accordance with one embodiment. The BI workload manager 200 includes three components: an admission controller 210, a scheduler 220, and an execution manager 230. These components may be implemented as software programs, software applications, or software modules in an EDW system. In one embodiment, the BI workload manager 200 is operable to: a) find a manipulated variable whose predicted value is more suitable than MPL for workload management; b) make the system stable over a wide range of this variable, that is, the system does not go either into underload or overload over a wide range of prediction errors for this manipulated variable; and c) once this range for the manipulated variable is known, control the manipulated variable to maintain its value in the middle of this range. Although various embodiments as described herein use queries as exemplary processes, or jobs, in workloads to be executed by the EDW system, it should be understood that such embodiments are also applicable to those workloads that include processes, or jobs, which require access to memory resources in the EDW system.

A manipulated variable may be any system resource that causes a bottleneck when processing queries on the EDW system, such as a central processing unit (CPU), a disk drive, and memory and message buffers. While saturation of CPU, disc, or message buffers may be limiting factors, once they are saturated, the throughput cannot be improved or degraded. However, over subscription of memory may lead to serious degradation in throughput performance because of thrashing. Thus, in one embodiment, memory is used as the manipulated variable. Accordingly, the admission controller 210 uses memory as a basis for admitting queries, wherein each batch is divided into sub-batches such that the memory requirement of queries in each sub-batch adds up to the available memory on the system. In execution control, the execution manager 230 executes each of these sub-batches of queries on a priority gradient called priority gradient multiprogramming (PGM) process. That is, each query in a sub-batch is executed with a unique priority, that stabilizes the EDW system over a wide range of memory prediction errors. The scheduler 220 is employed to provide assignment of priorities to the queries. The components 210, 220, and 230 are further described below.

With memory being used as the manipulated variable of choice in the BI workload manager 200, for a query $Q_i$, with execution time $E_i$, its memory requirement $m_i$ is given as:

$$m_i = \max\{\operatorname{avg}(m_{ict}) | 0 < t \cdot E_i\},$$

where $m_{ict}$ is the memory required by query $Q_i$ at time t at CPU c and the average is taken over all the CPUs at time t. For a batch of queries $Q_1, Q_2, \ldots, Q_n \cdot W$ (where a query $Q_i$ belongs to a workload W), and the average available memory across all CPUs is M, the size of the workload is given as xF where:

$$x = \cdot m_i / M.$$

That is, the workload is a factor x times the size of the average available memory, F=M, across all CPUs. For example, if the memory requirement of queries in a workload adds up to 12 GB and the average available memory across all CPUs in the EDW system is 4 GB, then the workload is of size 3 F.

The aim of execution control by the execution manager 230 is to stabilize for memory prediction errors. As shown from the above equations, when queries in a workload are executed at the same priority, hereinafter called equal priority multiprogramming or EPM, and the size of the workload is greater than the amount of memory available on an EDW system, system thrashing may occur and in turn produces severe performance deterioration. That is, in an EDW system that employs EPM, all processes, such as queries, are running with the same priority. When a process p page faults, it goes to the wait queue. When its page arrives, it goes to the end of the ready queue. All other processes prior to p in the ready queue are either finished or page fault before the CPU get to p. Thus, all the processes in the EDW system get a "fair" share of the system resources. EPM is robust for a reasonable range of overestimates. That is, if the size for a workload is overestimated such that actual memory required is less then expected, the throughput will remain in the optimal region. For example, it is found that EPM is stable for workloads between the sizes of ⅓ F and 1 F. However, EPM is very unstable for underestimates, wherein there is a sudden drop in throughput as the size of the workload increases beyond the available memory.

To overcome the aforementioned issue with EPM, a priority gradient multiprogramming (PGM) process is employed by the execution manager 230, wherein queries are executed at different priorities such that a gradient of priorities is created. That is, in an EDW system that employs a PGM process, if a highest priority process q page faults, once its required page arrives in memory, the process q will preempt the currently running process in the CPU instead of going to the back of the ready queue. The remaining memory resources are automatically allocated to the query running at the second highest priority level. This continues down the priority gradient, which results in processes such as queries asking for and releasing memory at different rates. The releasing of memory by prioritized processes or jobs in a workload alleviates memory contention, which is a primary cause of thrashing as further discussed later.

Accordingly, in one embodiment, the PGM process is a mechanism for executing a batch of queries $Q_1, Q_2, \ldots, Q_n \cdot W$ (where a query $Q_i$ belongs to a workload or batch W) in a database on the following conditions provided by the scheduler 220:

a) order all queries: all queries are uniquely ordered according to some ordering function $F_{ord}$, such that, $F_{ord}(Q_i)=j$, where $j \cdot [1, \ldots, n]$ and for all $i, j \cdot n, F_{ord}(Q_i) \cdot F_{ord}(Q_j)$; and b) pick queries in order and assign priorities in that order: pick query $Q_a$, where for $Q_a$, $F_{ord}(Q_a)=1$ and assign the highest priority $P_1$ to it. Then, pick query $Q_b$ where for $Q_b$, $F_{ord}(Q_b)=2$ and assign a priority $P_2$ such that $P_2<P_1$, and so on until all the queries in the workload have been assigned a priority or the range of permissible priorities runs out.

The difference between any two successive priorities, $P_{i+1}$ and $P_i$ is a step-size constant k. Because most operating systems have a fixed number of allowable priorities, setting k=1 permits for the largest possible number of queries being assigned a valid priority. For example, there are ten queries $Q_1, \ldots, Q_{10}$ in a workload, and the highest permissible priority for a query is 200. If the order function is chosen as $F_{ord}(Q_i)=i$ and the step-size constant is chosen as k=1. then the priority of $Q_1$ is 200, $Q_2$ is 199 and so on to $Q_{10}$ having a priority of 191. Thus, the workload with these priorities is admitted into the execution manager 230. For some database systems where different operations of a query are assigned different priorities by the execution manager 230, k may be larger. The ordering function $F_{ord}$ may be a function that assigns order based on a system characteristic, such as expected time taken, expected memory usage, or some other system resource characteristics. Alternatively, $F_{ord}$ may be a function that assigns a random order, which does not require computation of the aforementioned characteristics.

The aforementioned PGM process is operable in an EDW system that employs an operating system with a preemptive priority scheduler. As known in the art, a preemptive priority scheduler is available in a number of existing operating systems to receive a process that arrives at the ready queue, compare the priority of the newly-arrived process with a currently running process, and preempt the CPU for the newly-arrived process if its priority is higher than the priority of the currently running process. The PGM process provides an effective mechanism for stabilizing the right side (overload region 146) of the throughput curve as illustrated in FIG. 1 in order to protect against overload or thrashing.

A main cause of thrashing is severe memory contention, which may be explained in the context of a global page replacement policy that replaces virtual memory pages (or memory frames in the case of physical memory) regardless of the process to which such pages belong. For example, when a process (such as a query) p input to the EDW system requires more memory pages, it starts faulting and taking away pages from other processes. Because these other processes also need those pages, they also fault and take pages from other processes. These faulting processes must use a paging device to swap pages in and out. As they queue up for the paging device, the ready queue empties. As processes wait for the paging device, the CPU utilization drops. The CPU scheduler sees the decreasing CPU utilization and increases the number of processes. The new processes start by taking pages from the existing running processes, which further exacerbates memory contention, and CPU utilization drops further. As a result, the CPU executes more processes, and thrashing occurs with the throughput plunging significantly because the processes are spending all their time in page faulting.

Figure 3:
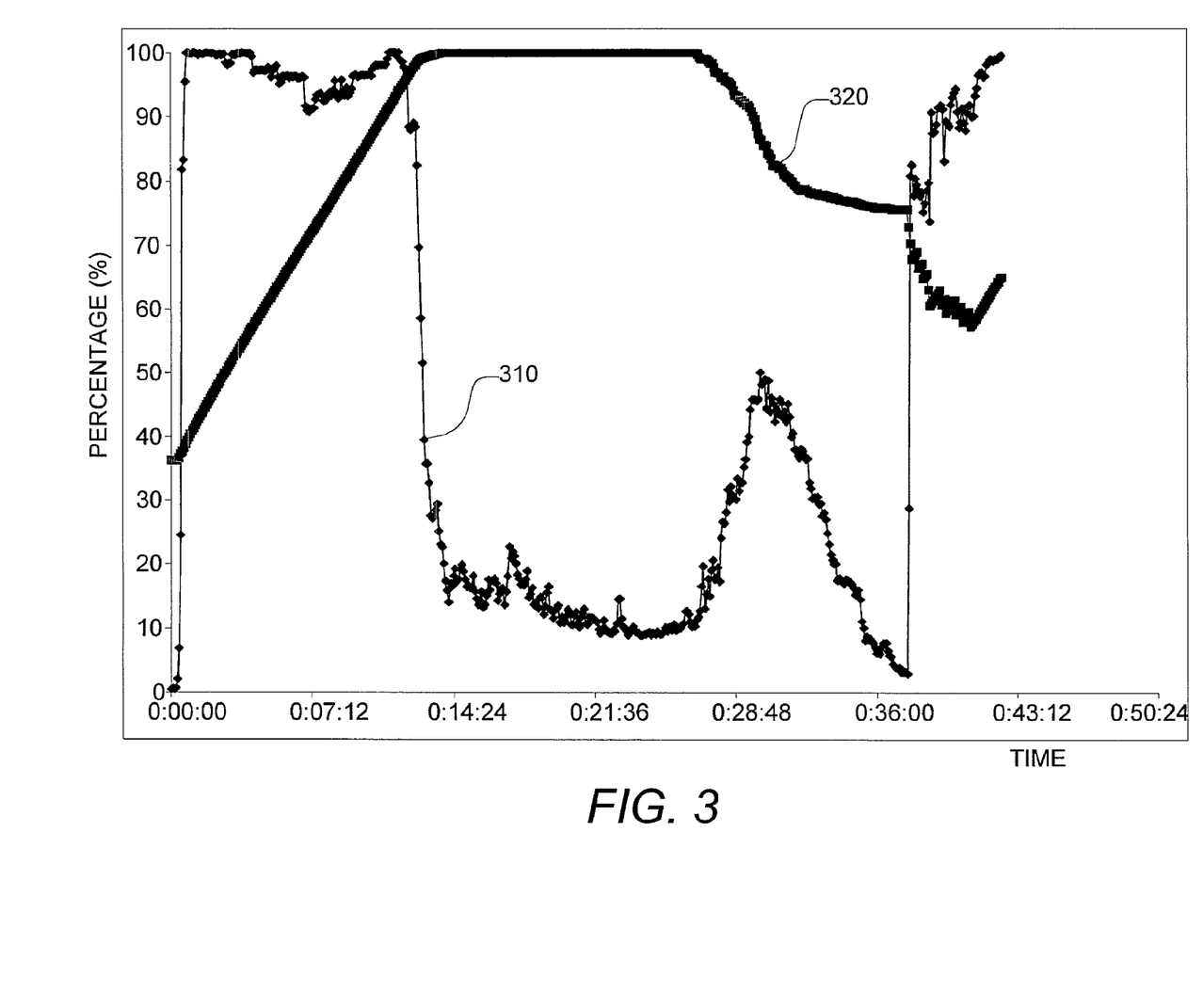
FIG. 3 illustrates a graph of CPU utilization and memory pressure 320 against time for an EDW system wherein thrashing has occurred, in accordance with one embodiment.

FIG. 3 illustrates a graph of CPU utilization 310 and memory pressure 320 against time for an EDW system wherein thrashing has occurred. As shown in FIG. 3, once the workload starts, the CPU quickly attains a 100% utilization. The memory pressure slowly begins to build up as an increasing number of processes demand memory. Once the memory pressure builds up beyond a certain point the CPU utilization starts to drop and very quickly falls to around 20% utilization. Only once the memory pressure begins to go down, the CPU utilization goes up. Thus, if the rise in memory pressure may be halted without losing too much CPU utilization, then there is a solution to the issue of thrashing, which the PGM process achieves. This is further explained with reference to FIG. 4, which illustrates the memory pressure curves (system memory used as a function of time) of two memory profiles or schemes for a typical workload.

Figure 4:
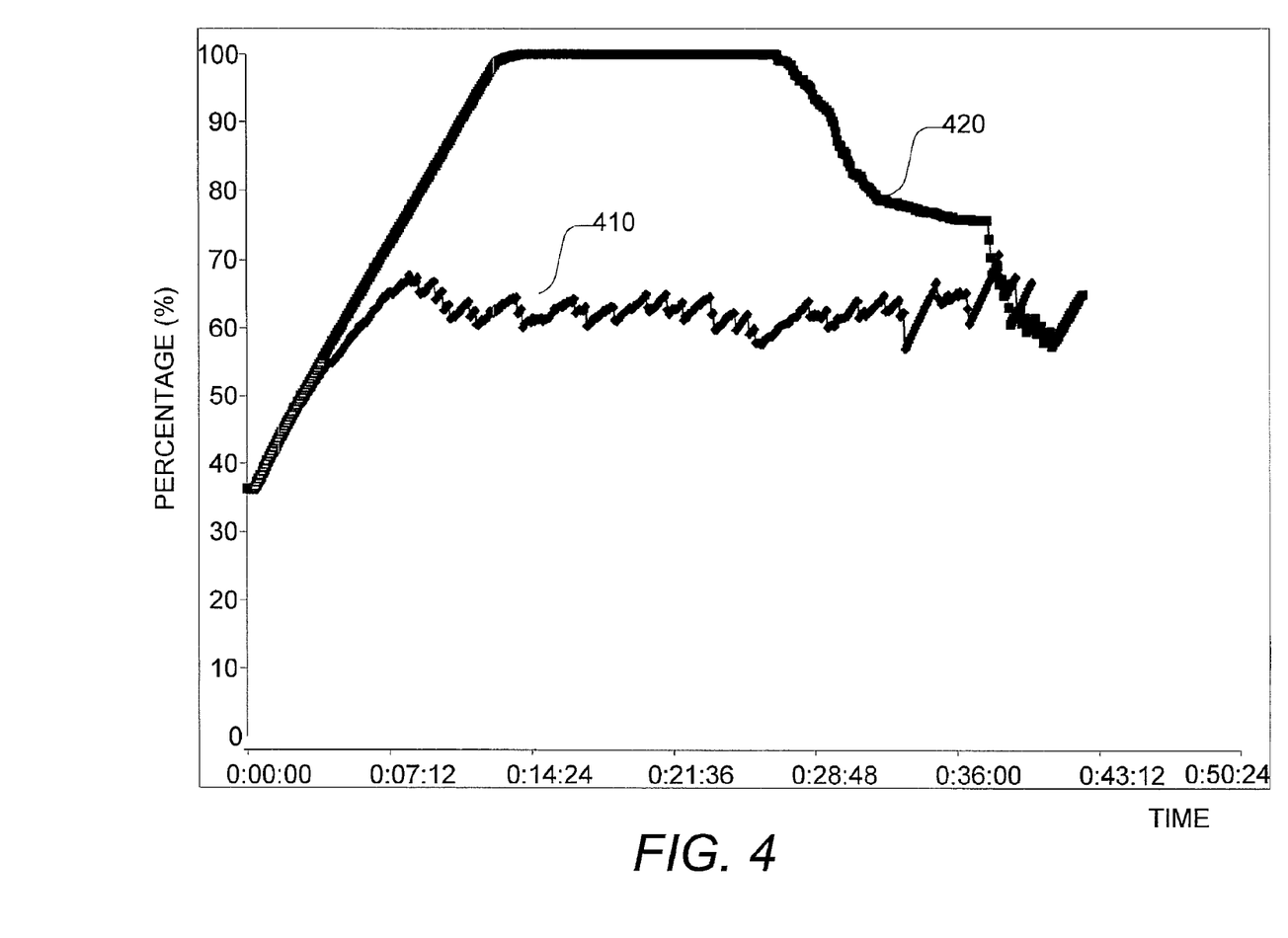
FIG. 4 illustrates memory pressure curves for the typical equal priority multiprogramming and priority gradient multiprogramming in accordance with one embodiment.

As illustrated in FIG. 4, the peak memory requirement for the PGM profile or process 410 is substantially lower than that of the EPM profile or scheme 420. This clearly indicates that PGM process reduces the peak memory requirement. This happens because the PGM process starts freeing memory sooner than EPM. That is, the higher priority queries get all the resource it needs and gets done quicker to free up its assigned memory. The saw-tooth behavior of the PGM curve 410 is an indicator that as the higher priority queries get done, they release their memory to reduce the peak value of memory pressure. Furthermore, the initial slope of the PGM memory profile has a lesser slope than that of the EPM memory profile. This happens because the queries lower down in the priority order do not get a chance to ask for all the memory they need. Thus, by requesting memory at a slower rate and releasing memory quicker, the PGM process eliminates or at least reduces thrashing. Thrashing is eliminated if the peak memory requirement never gets so high as to cause thrashing, and even if it becomes high, the peak values remain less than those peak values in EPM.

The execution control by the execution manager 230 relies on unique priority given to queries or that such queries be arranged in some order $F_{ord}$. In one embodiment, as noted earlier, the order of priorities is provided by the scheduler 220 so as to implement the PGM profile, and such an order may be randomly chosen. In another embodiment, if a workload is in the optimal region 144, the order of priorities provided by the scheduler 220 may be randomly chosen. However, it is noted that the throughput penalty for being in the overload region 146 is much higher than being in the underload region 142. Hence, the scheduler 220 may provide a scheduling order that stabilizes the EDW system for memory underestimation errors. In one embodiment, the scheduling order provided is the Largest Memory Priority (LMP) order as described in U.S. Provisional Patent Application Ser. No. 61/042,954 as noted above.

Figure 5:
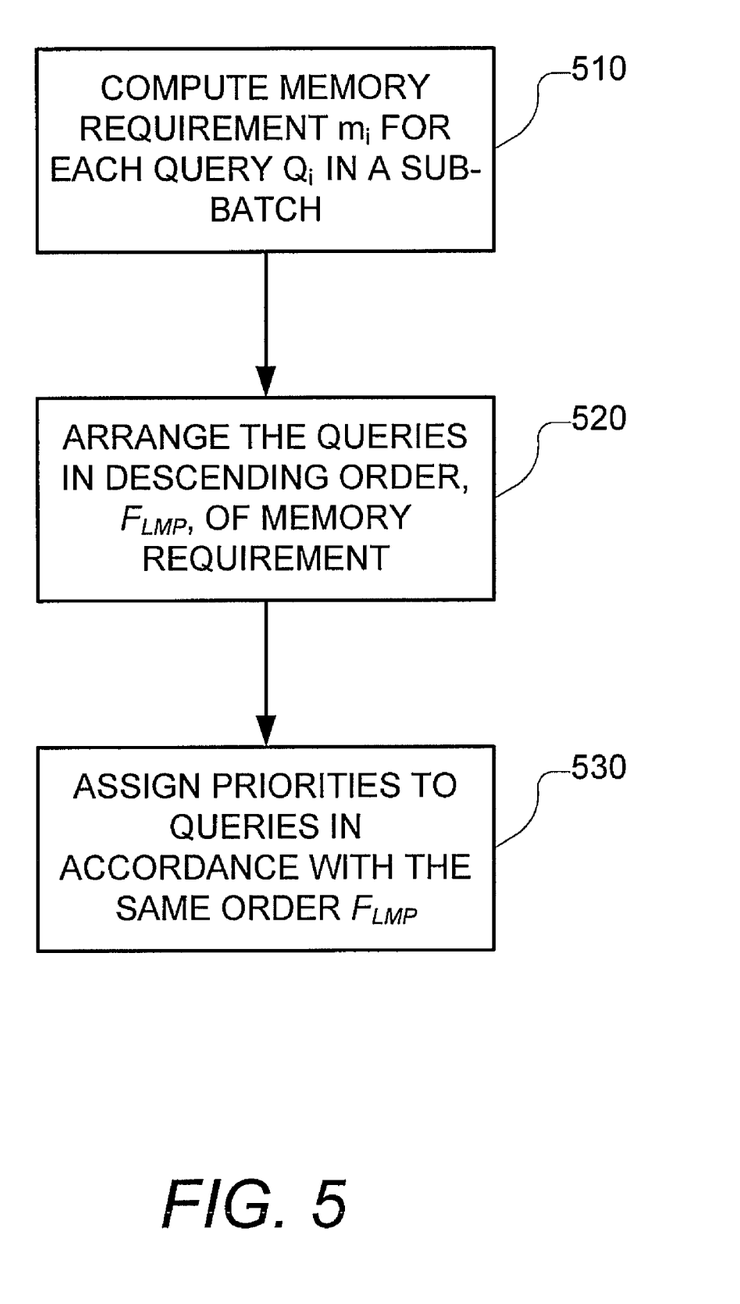
FIG. 5 illustrates a scheduling order process performed by a scheduler in a business intelligence workload manager, in accordance with one embodiment.

Under the LMP order, the queries are assigned priority in the order of their memory requirement. As the name implies, the query with the largest memory requirement is given the highest priority. That is, as illustrated in FIG. 5, a LMP order $F_{LMP}$ of a batch of queries, $Q_1, Q_2, \ldots, Q_n \cdot W$ (where a query $Q_i$ belongs to a workload or batch W), in a database is arranged as follows: At 510, the memory requirement $M_i$ is computed for each query $Q_i$. At 520, the queries are arranged in descending order $F_{LMP}$, of memory requirement $m_i$. such that, $F_{LMP}(Q_i)=j$, where $j \cdot [1, \ldots, n]$, and for all $i, j \cdot n, F_{LMP}(Q_i) \cdot F_{LMP}(Q_j)$. At 530, the queries are picked in the order of $F_{LMP}$ and their priorities are assigned in the same order. For example, query $Q_a$ is picked, where $F_{LMP}(Q_a)=1$ with the highest priority $P_1$ assigned to it. Next, query $Q_b$ is picked, where $F_{LMP}(Q_b)=2$ with a second highest priority $P_2$ assigned to it, such that $P_2 < P_1$. This is performed until all the queries in a sub-batch have been assigned a priority.

With LMP ordering, the query with the largest memory requirement gets the highest priority and is amongst the earliest to be done and releases its memory. Typically, queries in a workload start building up their memories, and the memory requirement continues to rise unless some memory is released. In EPM, this causes thrashing because all queries have the same priority. In a PGM process, the optimal region 144 is extended as queries finish up and release their memories. LMP ordering further extenuates the PGM process by giving the highest priority to the query that would release the largest amount of memory.

Figure 6:
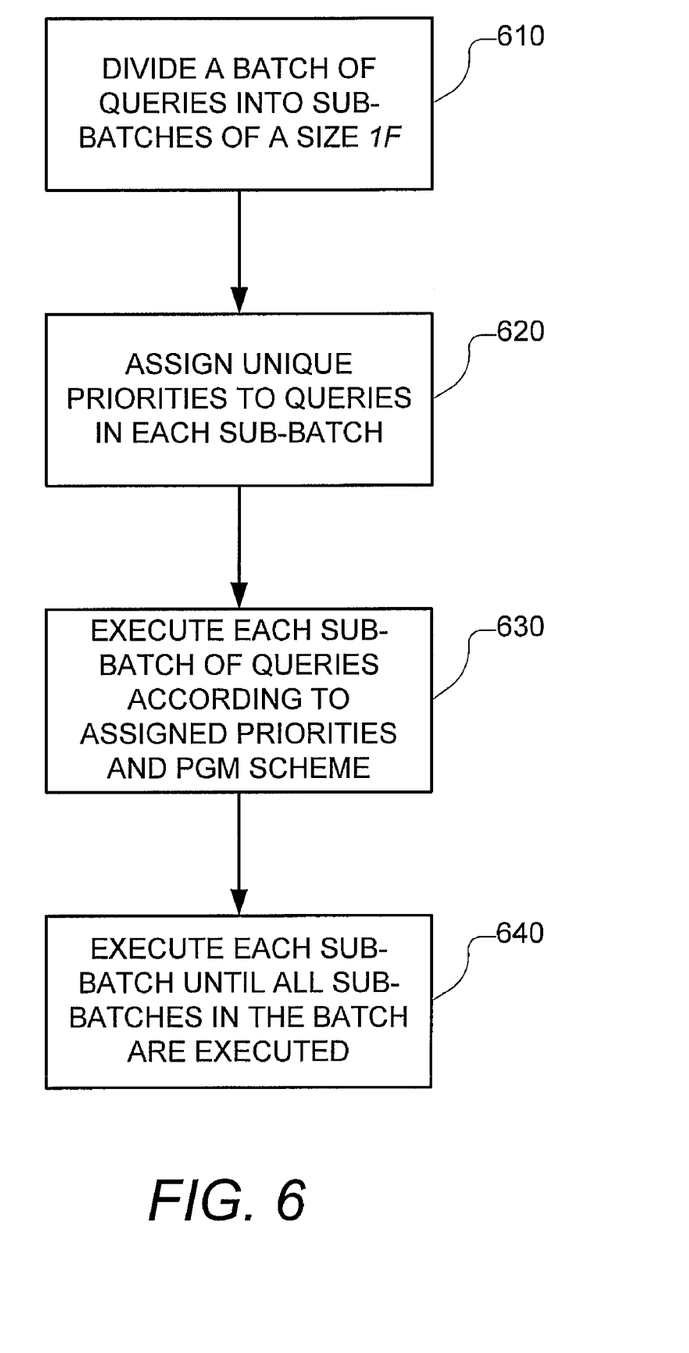
FIG. 6 illustrates an admission control policy in accordance with one embodiment.

With memory as the manipulated variable of choice and the aforementioned scheduler 220 and execution manager 230, the admission controller 210 employs an admission policy in accordance with a process as illustrated in FIG. 6.

At 610, a workload such as a batch of queries are divided into sub-batches such that each sub-batch is of a size 1 F, that is, utilizing substantially the size of the average available memory across all CPUs in the EDW system. Known methods may be used for dividing a batch into sub-batches. For example, the division of a batch of queries into sub batches may be reduced to a 1-dimensional bin packing issue that includes packing irregular 1-dimensional object into bins of fixed size such that the number of bins is a minimum, with 1 F being the size of the bin and the queries as the packages that need to be packed in the bins. This issue is a nondeterministic polynomial-time hard (NP-Hard) issue. Any known approximate algorithm, such as the First Fit Decreasing (FFD) algorithm, may be used to solve such an issue. FFD has known bounds of the number of bins being at most (11/9)+1 times the optimal number of bins. Accordingly, applying to the BI workload manager 200, FFD may be rewritten as: a) arranging queries of the batch in descending order of memory requirement $m_i$; b) for every query $Q_i$ in this order, insert or assign $Q_i$ in the first sub batch that can accommodate the query (without the size of the sub batch exceeding 1 F); and c) repeating step b until all the queries have been assigned to a sub-batch.

At 620, each sub-batch has its queries therein assigned with unique priorities based on the LMP ordering by the scheduler 220.

At 630, each sub-batch of queries is executed by the execution manager 230 in accordance with assigned priorities of the queries in the PGM process.

At 640, once execution of a sub-batch is completed or done, a new sub-batch is introduced for execution by the BI workload manager 200 until all sub-batches of the workload are executed. In one embodiment, a batch (or sub-batch) of queries is done when all three of the following conditions are satisfied: a) When a predetermined threshold $T_{finish}$ number of queries are done; b) the memory pressure falls below a predetermined threshold $T_{mem}$; and c) the average CPU utilization falls below a predetermined threshold $T_{CPU}$.

Figure 7:
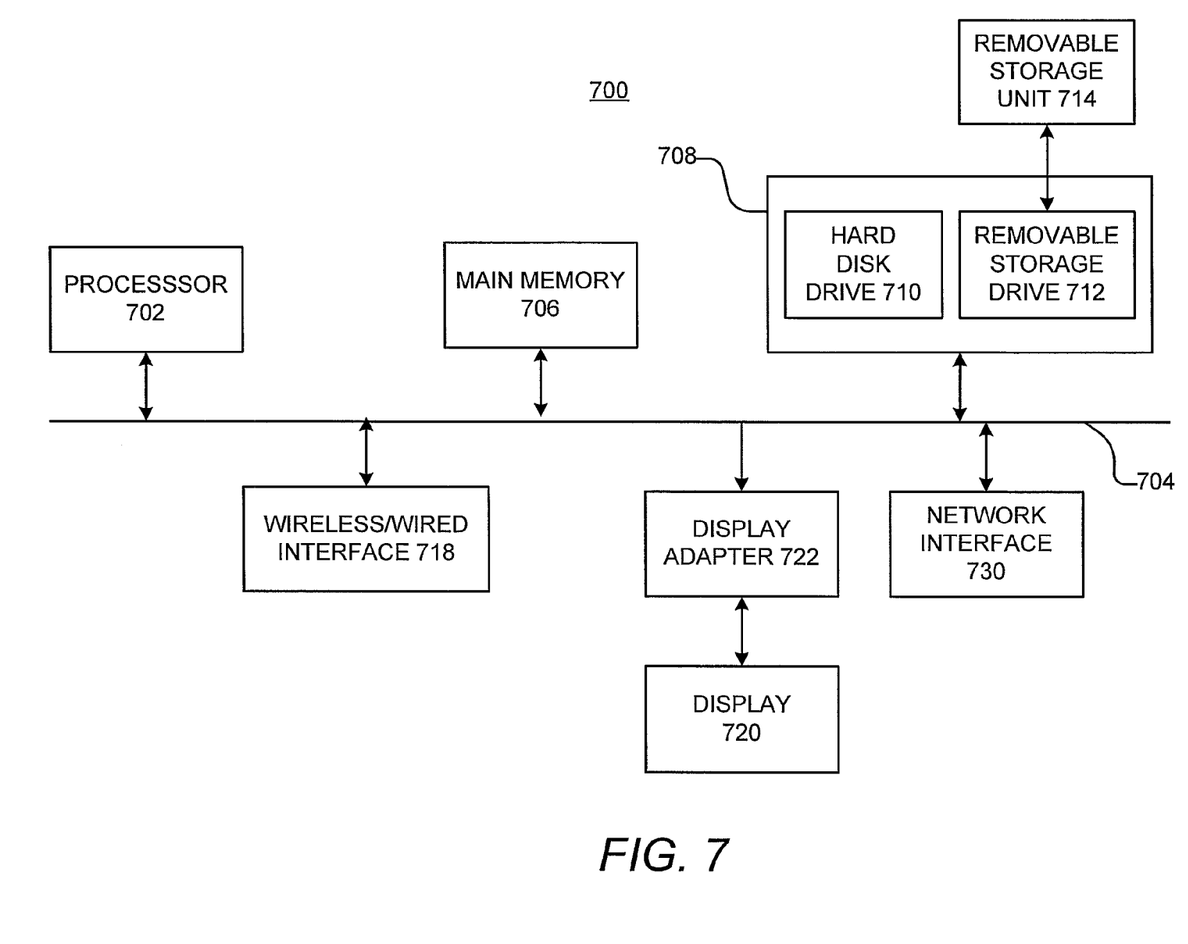
FIG. 7 illustrates a platform in which a business intelligence workflow manager may be implemented, in accordance with one embodiment.

FIG. 7 illustrates a block diagram of a computerized system 700 that is operable to be used as a platform for implementing the BI workload manager 200. The computerized system 700 may be a standalone BI workload manager 200 that is in communication with or has access to an EDW system to manage the workloads therein. Alternatively, the computerized system 700 may be a part of the EDW system, wherein memory storage components in the system 700 may be used to implement a data repository and the BI workload manager 200.

The computer system 700 includes one or more processors, such as processor 702, providing an execution platform for executing software. Thus, the computerized system 700 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 702 are communicated over a communication bus 704 or through point-to-point links with other components in the computer system 700.

The computer system 700 also includes a main memory 706 where software is resident during runtime, and a secondary memory 708. The secondary memory 708 may also be a computer-readable medium (CRM) that may be used to store software programs, applications, or modules that implement components in the BI workflow manager 200. Thus, the CRM is operable to store software programs, applications, or modules that implement the components 210, 220, and 230 in the BI workload manager 200. The main memory 706 and secondary memory 708 (and an optional removable storage unit 714) each includes, for example, a hard disk drive 710 and/or a removable storage drive 712 representing a floppy diskette drive, a magnetic tape drive, a compact disk drive, etc., or a nonvolatile memory where a copy of the software is stored. In one example, the secondary memory 708 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 700 includes a display 720 connected via a display adapter 722, user interfaces comprising one or more input devices 718, such as a keyboard, a mouse, a stylus, and the like. However, the input devices 718 and the display 720 are optional. A network interface 730 is provided for communicating with other computer systems via, for example, a network.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A workload manager for managing a workload in a database, comprising:

an admission controller to divide the workload into a plurality of batches, with each batch having at least one workload process to be performed in the database, and each batch having a memory requirement based on available memory for processing the workload;

a scheduler, executed by a hardware processor, to assign a unique priority to each workload process in each of the plurality of batches, the unique priorities to provide an order in which each workload process is executed in the database, wherein each assigned unique priority is different from any other of the assigned unique priorities; and an execution manager to execute each workload process in each of the plurality of batches in accordance with the unique priority assigned to each workload process.

2. The workload manager of claim 1, wherein the workload comprises a plurality of database queries, and each of the plurality of batches includes at least one database query as the at least one workload process.

3. The workload manager of claim 1, wherein the admission controller is further to arrange each workload process in each of the plurality of batches in order of memory requirement so as to divide the workload into the plurality of batches.

4. The workload manager of claim 1, wherein the scheduler is to randomly assign the unique priority to each workload process in each of the plurality of batches.

5. The workload manager of claim 1, wherein the scheduler is to assign the unique priority to each workload process in each of the plurality of batches based on a memory requirement of the workload process.

6. The workload manager of claim 5, wherein each workload process in a first batch of the plurality of batches comprises a plurality of workload processes, and a workload process of the plurality of workload processes with the highest memory requirement in the first batch is assigned a highest priority as its unique priority.

7. The workload manager of claim 1, wherein the scheduler is to assign the unique priority to each of the at least one workload process in each of the plurality of batches based on a resource characteristic in the database.

8. A method for managing a workload of queries in a database, comprising:
  dividing the workload of queries into a plurality of batches of queries such that each batch has a memory requirement of no more than an average available memory for processing workloads in the database;
  assigning a unique priority to each of the queries, the unique priorities providing an order in which each query is executed in the database, wherein each assigned unique priority is different from any other of the assigned unique priorities; and
  executing each of the plurality of batches by:
  a) executing at least one query in one batch based on the unique priority assigned to the at least one query in the one batch;
  b) determining whether the execution of the one batch is done; and
  c) executing another batch of the plurality of batches once the execution of the selected batch is done.

9. The method of claim 8, wherein determining whether the execution of the one batch is done comprises at least one of:
  first determining whether a predetermined threshold number of queries in the one batch is done;
  second determining whether a usage of memory of the database by the one batch falls below a predetermined memory threshold; and
  third determining whether an average utilization of a processing power of the database by the one batch falls below a predetermined processing threshold.

10. The method of claim 9, wherein determining whether the execution of the one batch is done comprises the steps of first determining, second determining, and third determining.

11. The method of claim 8, wherein dividing the workload of queries into a plurality of batches of queries comprises:
  arranging the queries in the workload in descending order of memory requirement;
  assigning a first one of the queries in the arranged descending order to one of the plurality of batches that is able to accommodate each query without exceeding an average available memory for processing workloads in the database; and
  repeating the step of assigning each query, in the arranged descending order, until all of the queries in the workload are assigned to the plurality of batches.

12. The method of claim 8, wherein assigning a unique priority to each of the queries in each of the plurality of batches comprises:
  uniquely ordering the queries in each of the plurality of batches; and
  assigning the unique priority to each of the queries in each batch from highest priority to lowest priority in accordance with the unique ordering of the queries in each batch.

13. The method of claim 12, wherein uniquely ordering the queries comprises:
  uniquely ordering the queries in each of the plurality of batches according to an ordering function that randomly orders the queries.

14. The method of claim 12, wherein unique ordering the queries comprises:
  uniquely ordering the queries in each of the plurality of batches according to an ordering function based on a memory requirement of each of the queries in each batch.

15. The method of claim 14, wherein uniquely ordering the queries in each of the plurality of batches according to an ordering function further comprises:
  ranking a query that has a highest memory requirement in the batch as a first query, and ranking a query that has a lowest memory requirement in the batch as a last query.

16. The method of claim 15, wherein assigning the unique priority to each of the queries in each batch includes assigning the unique priority from highest priority to lowest priority, wherein the highest priority is assigned to the first ranked query and the lowest priority is assigned to the last-ranked query.

17. A non-transitory computer readable medium on which is encoded code that when executed by a processing unit, the code is to:
  divide the workload of queries into a plurality of batches of queries such that each batch has a memory requirement of no more than an average available memory for processing workloads in the database;
  assign a unique priority to each of the queries in each of the plurality of batches, the unique priorities to provide an order in which each workload process is executed in the database, wherein each assigned unique priority is different from any other of the assigned unique priorities; and
  execute each of the plurality of batches, wherein to execute each of the plurality of batches, the code is to:
  a) execute one of the plurality of batches based on the unique priority assigned to each of the queries in the one batch;
  b) determine whether the execution of the one batch is done; and
  c) execute another one of the plurality of batches once the execution of the one batch is done.

18. The non-transitory computer readable medium of claim 17, wherein the code to divide the workload of queries into a plurality of batches of queries comprises code to:
  arrange the queries in the workload in descending order of memory requirement;
  assign a first one of the queries in the arranged descending order to one of the plurality of batches that is able to accommodate each query without exceeding an average available memory for processing the workloads in the database; and repeat the assignment of each query, in the arranged descending order, until all of the queries in the workload are assigned to the plurality of batches.

19. The non-transitory computer readable medium of claim 17, wherein the code to assign a unique priority to each of the queries in each of the plurality of batches comprises code to:

uniquely order the queries in each of the plurality of batches; and assign the unique priority to each of the queries in each batch from highest priority to lowest priority in accordance with the unique ordering of the queries in each batch.

20. The method of claim 12, wherein uniquely ordering the queries comprises:

uniquely ordering the queries in each of the plurality of batches according to an ordering function that randomly orders the queries; and uniquely ordering the queries in each of the plurality of batches according to an ordering function that is based a memory requirement of each of the queries in each batch.

\* \* \* \* \*